(12) United States Patent
Tajima et al.

(10) Patent No.: US 7,175,319 B2
(45) Date of Patent: Feb. 13, 2007

(54) VEHICLE LIGHTING APPARATUS

(75) Inventors: Keiichi Tajima, Shizuoka (JP);
Tsutomu Takiguchi, Shizuoka (JP);
Kazuma Mochizuki, Shizuoka (JP);
Naoki Takii, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 118 days.

(21) Appl. No.: 11/014,090

(22) Filed: Dec. 15, 2004

(65) Prior Publication Data
US 2005/0141234 A1 Jun. 30, 2005

(30) Foreign Application Priority Data
Dec. 25, 2003 (JP) ............... P. 2003-429231

(51) Int. Cl.
*B60Q 1/06* (2006.01)
*F21V 21/14* (2006.01)

(52) U.S. Cl. ............. 362/465; 362/464; 362/523; 362/524

(58) Field of Classification Search .......... 362/524, 362/523, 464–466, 467–469, 526, 528, 530–532, 362/285–289, 386, 418, 419, 449, 525, 512, 362/40, 39, 41, 529
See application file for complete search history.

(56) References Cited

U.S. PATENT DOCUMENTS

| | | | | |
|---|---|---|---|---|
| 4,333,131 A | * | 6/1982 | Hujimoto et al. | 362/549 |
| 5,562,336 A | * | 10/1996 | Gotou | 362/466 |
| 5,707,133 A | * | 1/1998 | Burton | 362/460 |
| 6,623,147 B2 | * | 9/2003 | Hayami et al. | 362/467 |
| 6,652,110 B2 | * | 11/2003 | Hayami | 362/464 |
| 6,799,876 B2 | * | 10/2004 | Ravier | 362/524 |
| 6,874,918 B2 | * | 4/2005 | Tawa et al. | 362/465 |
| 2003/0169587 A1 | * | 9/2003 | Uchida | 362/465 |

FOREIGN PATENT DOCUMENTS

JP   2003-260980   9/2003

\* cited by examiner

*Primary Examiner*—Sandra O'Shea
*Assistant Examiner*—Bao Q. Truong
(74) *Attorney, Agent, or Firm*—Fish & Richardson, P.C.

(57) ABSTRACT

A lamp body 20 includes a lamp unit 60 whose irradiation direction is changed according to a running state of a vehicle, a horizontal driving mechanism 90 for horizontally changing the irradiation direction, and a vertical driving mechanism 100 for vertically changing the irradiation direction. The horizontal driving mechanism and the vertical driving mechanism are integrated with each other, so that a lighting apparatus 10 can be mounted in a vehicle by using only a small mounting space. Moreover, the lighting apparatus 10 needs only small numbers of components and mounting man-hours.

8 Claims, 6 Drawing Sheets

VEHICLE LIGHTING APPARATUS

This application claims foreign priority based on Japanese patent application No. JP-2003-429231, filed on Dec. 25, 2003, the contents of which is incorporated herein by reference.

BACKGROUND OF THE INVENTION

The present invention relates to a novel lighting apparatus of a vehicle. More particularly, the invention relates to a lighting apparatus having a horizontal driving mechanism for changing an irradiation direction in the horizontal direction and a vertical driving mechanism for changing the irradiation direction in the vertical direction, and to a technique for simplifying a structure.

There has been a lighting apparatus of a vehicle adapted so that an irradiation direction thereof is changed according to a running state of the vehicle.

For example, sometimes, the irradiation direction of a vehicle headlamp becomes excessively upward or downward in response to change in a load. In such a case, it is necessary to timely correct the irradiation direction by changing the irradiation direction downwardly or upwardly. Further, when the vehicle runs on a winding road or turns in an intersection, it is convenient that the irradiating direction can be changed laterally so as to rapidly irradiate a road surface and so on located in the running direction of the vehicle.

JP-A-2003-260980 discloses a headlamp configured so that a fixed lamp and a swivel lamp are supported on a bracket tiltable with respect to a lamp body, that the swivel lamp is enabled to horizontally tilt with respect to the bracket, and that the headlamp has an actuator for horizontally tilting the swivel lamp with respect to the bracket, and also has a leveling actuator for vertically tilting the bracket with respect to the lamp body.

Such a headlamp can horizontally tilt the swivel lamp and horizontally change the irradiation direction of the swivel lamp by driving the actuator. Also, such a headlamp can vertically tilt the swivel lamp and vertically change the irradiation direction of the swivel lamp by driving the leveling actuator.

The headlamp of JP-A-2003-260980 can timely change the irradiation direction horizontally and vertically according to the running state of the vehicle.

Meanwhile, the headlamp of JP-A-2003-260980 needs separate actuators respectively used for horizontally changing the irradiation direction and for vertically changing thereof.

Thus, it is necessary for individually mounting two actuators on the lamp body or the like. Consequently, man-hours for manufacturing the headlamp is large. Also, mounting parts and members (such as mounting screws) for mounting the actuators areneeded. This results in increase in the cost of the headlamp.

Furthermore, it is necessary to provide structures each for mounting the actuator at two places, respectively. This also causes the increase in the cost.

Additionally, the two actuators should separately be disposed. Moreover, motion spaces in which movable members for changing the irradiation direction, for example, a reflector and a bracket, move, should be ensured. Thus, the miniaturization of the lamp is hindered. A space is needed at the side of the vehicle. There are such spatial disadvantages.

SUMMARY OF THE INVENTION

Accordingly, the problem to be solved by the invention is to provide a lighting apparatus, which can be mounted in a vehicle by using only a small mounting space, and which needs only small numbers of components and manufacturing man-hours.

To solve the problems, according to an embodiment of the invention, a lighting apparatus of a vehicle comprises a lamp body including a lamp unit whose irradiation direction is changed according to a running state of the vehicle, a horizontal driving mechanism for horizontally changing the irradiation direction, and a vertical driving mechanism for vertically changing the irradiation direction in a lamp body. In the lighting apparatus, the horizontal driving mechanism and the vertical driving mechanism are integrated with each other.

Since, in the lighting apparatus according to the embodiment of the invention, the horizontal driving mechanism and the vertical driving mechanism are integrated with each other, the manufacturing man-hours is small. Also, the number of mounting components is small. Moreover, since the driving mechanism can be mounted in the lamp body at a single portion, the structure of the lamp body, the lamp unit, or a bracket can be simplified. Thus, the manufacturing cost of these members can also be reduced.

The lighting apparatus according to the embodiment of the invention, a lamp body includes a lamp unit whose irradiation direction is changed according to a running state of a vehicle, a horizontal driving mechanism for horizontally changing the irradiation direction, and a vertical driving mechanism for vertically changing the irradiation direction, and the horizontal driving mechanism and the vertical driving mechanism are integrated with each other.

Since, in the lighting apparatus of the embodiment of the invention, the horizontal driving mechanism and the vertical driving mechanism are integrated with each other, therefore, the manufacturing man-hours is small. Also, the number of mounting components is small. Moreover, since the driving mechanism can be mounted in the lamp body at only one portion, the structure of the lamp body, the lamp unit, or a bracket can be simplified. Thus, the manufacturing cost of these members can be reduced.

Further, according to the embodiment of the invention, the horizontal driving mechanism and the vertical driving mechanism are provided in a single housing. Thus, the man-hours required to assemble the driving mechanisms can be reduced to thereby decrease the manufacturing cost thereof.

Furthermore, according to the embodiment of the invention, the horizontal driving mechanism and the vertical driving mechanism are supported tiltably with respect to the lamp body. Thus, the driving mechanism do not protrude toward the rear of the lamp body. Consequently, the depth of the lamp can be reduced.

Also, the assembling of the lamp unit can be performed in front thereof. Thus, favorable assembling efficiency is obtained. This contributes to reduced cost.

Moreover, according to the embodiment of the invention, the supply of electric power and/or a control signal to the horizontal driving mechanism and the vertical driving mechanism is performed through a single connector. Thus, the number of components (for instance, a connector) can be reduced. Also, wiring in the lamp can be simplified.

Further, according to the embodiment of the invention, circuits for driving the horizontal driving mechanism and the vertical driving mechanism are disposed on the same board.

Thus, the driving mechanism can be miniaturized. Also, a power supply circuit and control components can be shared by the two driving mechanism. Consequently, reduction in the number of components can be realized.

DESCRIPTION OF THE PREFERRED EMBODIMENT

Lighting apparatuses embodying the invention will now be described by reference to the drawings.

[First Embodiment]

FIGS. 1 to 5 show a first embodiment of the invention, which is applied to a vehicle headlamp.

Figure 1:
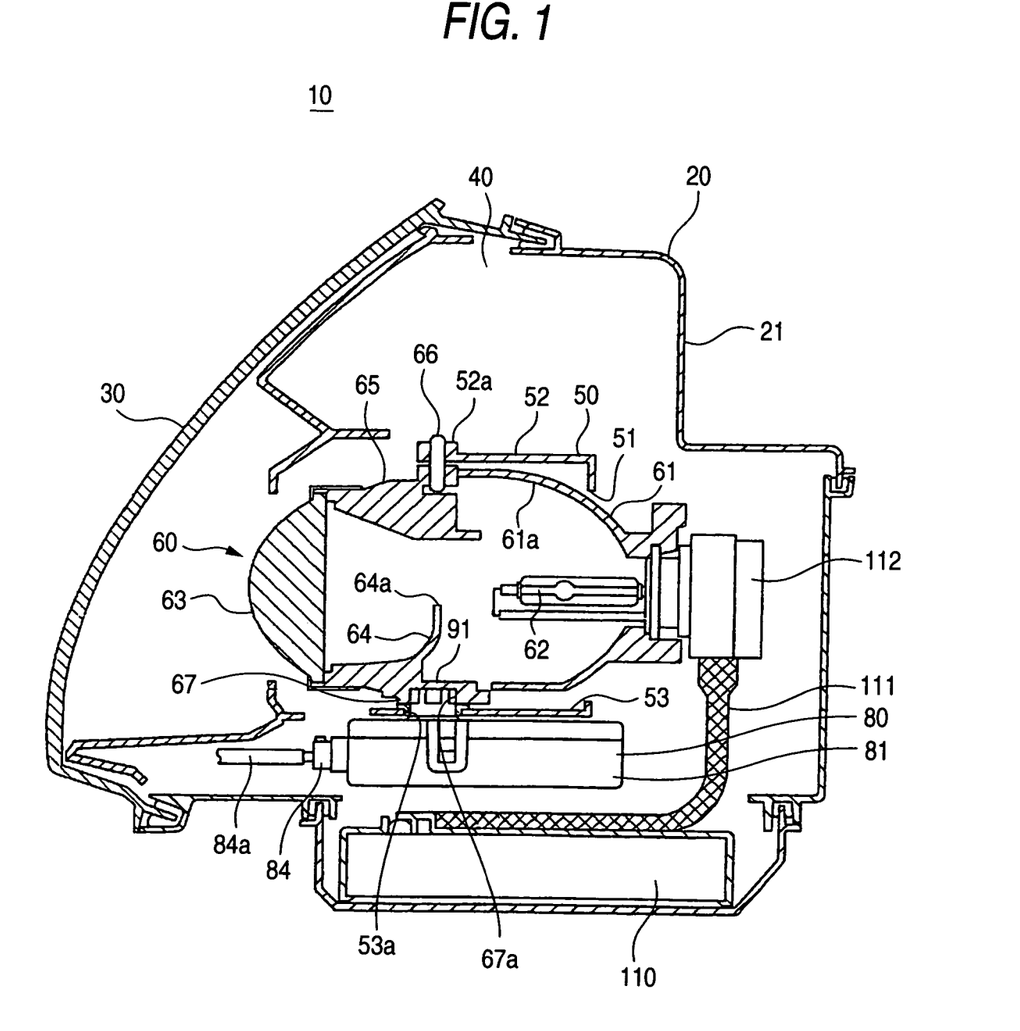
FIG. 1 is a schematically longitudinal cross-sectional view illustrating a first embodiment of a lighting apparatus according to the invention.

As is seen from FIG. 1, a vehicle headlamp 10 has a lamp body 20 having a concave portion frontwardly opened. A lamp chamber 40 is formed by covering the front opening of the lamp body 20 with a transparent cover 30.

Figure 2:
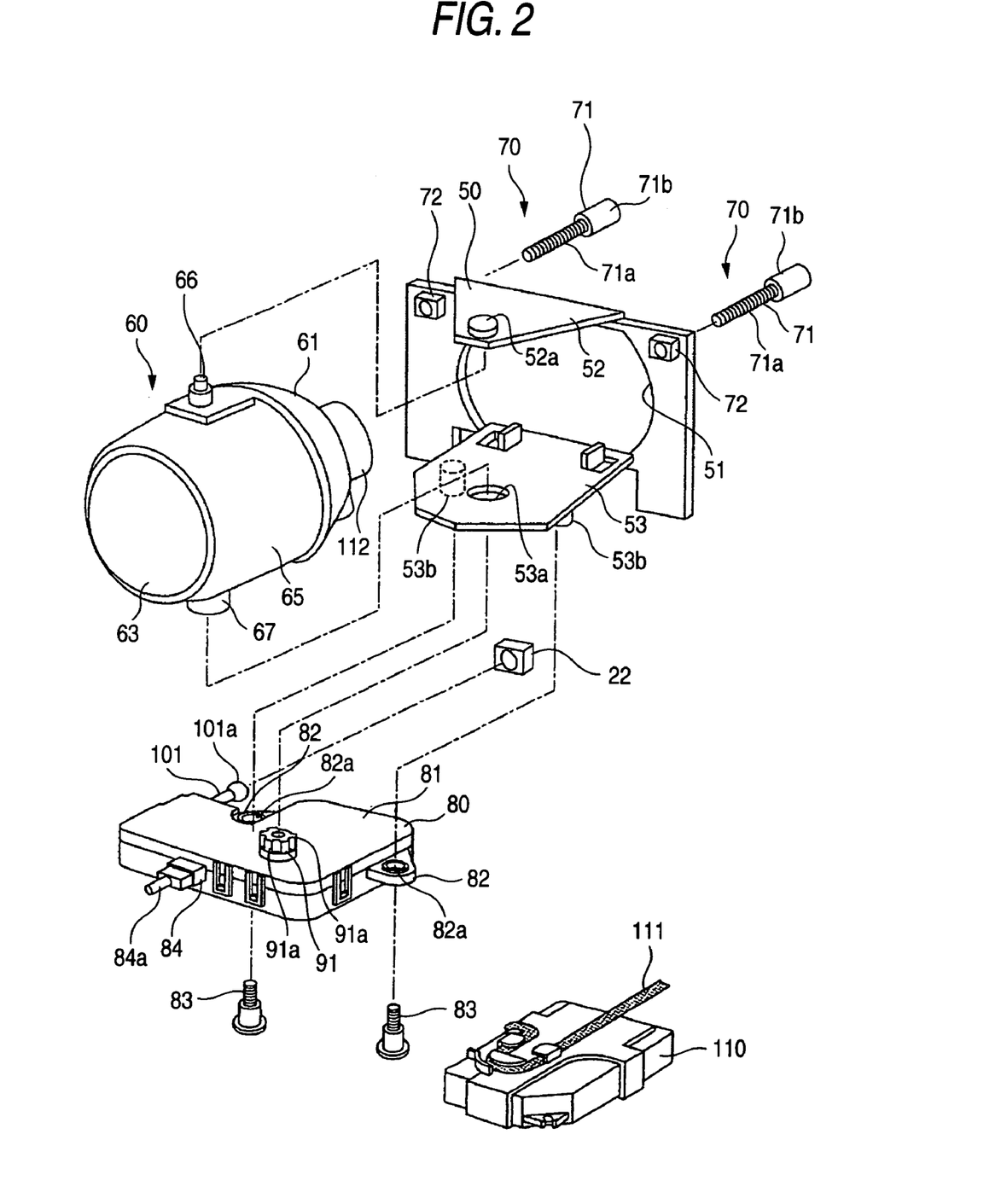
FIG. 2 is an exploded perspective view illustrating a principal part of the first embodiment of the lighting apparatus according to the invention.

As is seen from FIGS. 1 and 2, a bracket 50 supported tiltably with respect to the lamp body 20 is disposed in the lamp chamber 40. A lamp unit 60 is horizontally tiltably supported by the bracket 50. The bracket 50 has upper two points horizontally spaced apart from each other, which are supported by turn-supporting-point portions 70, 70, and also has a lower part thereof supported through a biaxial actuator (to be described later).

The turn-supporting-point portion 70 comprises an adjusting shaft 71, which is rotatably supported on a rear surface wall 21 of the lamp body 20, and a nut element 72 supported by the bracket 50. The adjusting shaft 71 is constructed by forming a head portion 71b at a rear end of a threaded shaft portion 71a in such a way as to be integral with each other. The adjusting shaft 71 can be rotated by protruding the head portion 71b to the rear side of the rear surface wall 21 of the lamp body 20, and by then operating the head portion 71b. The nut element 72 is supported in a state in which the nut element 72 can slightly be tilted with respect to the bracket 50. The threaded shaft portion 71a of the adjusting shaft 71 is screwed into the nut element 72. Therefore, when the adjusting shaft 71 is rotation-operated, the threaded shaft portion 71a is screwed into or out of the nut element 72 according to a rotation direction. Thus, the spacing between the portion of the bracket 50, which supports the nut element 72, and the rear surface wall 21 of the lamp body 20 is changed. Incidentally, the turn-supporting-point portion 70 is configured in such a way as to be able to adjust the spacing between the bracket 50 and the rear surface wall 21 of the lamp body 20. However, the turn-supporting-point portion 70 may be configured in such a way as to be unable to adjust the spacing therebetween.

A large and nearly rectangular opening 51 is formed in the bracket 50. Supporting pieces 52 and 53 are protruded from both the upper and lower edges of the opening 51, respectively. Further, an axially supporting portion 52a is formed at the front end of the upper supporting piece 52. A through hole 53a is formed in the front end portion of the lower supporting piece 53. Furthermore, mounting bosses 53b, 53b are protruded from the bottom surface of the lower supporting piece 53.

The lamp unit 60 has a reflector 61, a light source bulb 62 supported by the reflector 61, a projection lens 63 provided in such a way as to cover the front part of the reflector 61, and a shade 64 for limiting the upper edge of a pattern (a light distribution pattern) of irradiation light. The reflector 61 has a reflection surface 61a having a light converging property. The convex-lens-type projection lens 63 is supported at the end portion of a nearly cylindrical mounting frame 65, which is fixed to the front end portion of the reflector 61.

Light outputted from the light source bulb 62 and reflected by the reflection surface 61a is converged in the vicinity of an upper edge 64a of the shade 64. Further, a focal point of the projection lens 63 is located in the vicinity of the upper edge 64a of the shade 64. Therefore, a beam, the upper edge of the light distribution pattern of which is limited by the upper edge 64a of the shade 64, is frontwardly irradiated by the projection lens 63.

A supporting point shaft 66 is upwardly protruded from the top surface of the rear end portion of the mounting frame 65, while a connecting boss 67 is downwardly protruded from the bottom surface of the same rear end portion. Further, a connecting concave portion 67a (see FIG. 1) opened downwardly is formed in the connecting boss 67. Incidentally, the center of the connecting concave portion 67a and that of the supporting point shaft 66 are coaxially positioned.

Further, the lamp unit 60 is configured so that the supporting point shaft 66 is rotatably supported by the axially supporting portion 52a of the supporting piece 52, and that the connecting boss 67 is downwardly passed through the through hole 53a. Further, the rear end portion of the lamp unit 60 is backwardly protruded from the opening 51 of the bracket 50.

A biaxial actuator 80 constituted by integrally forming the horizontal driving mechanism and the vertical driving mechanism is supported under the lower supporting piece 53.

Figure 3:
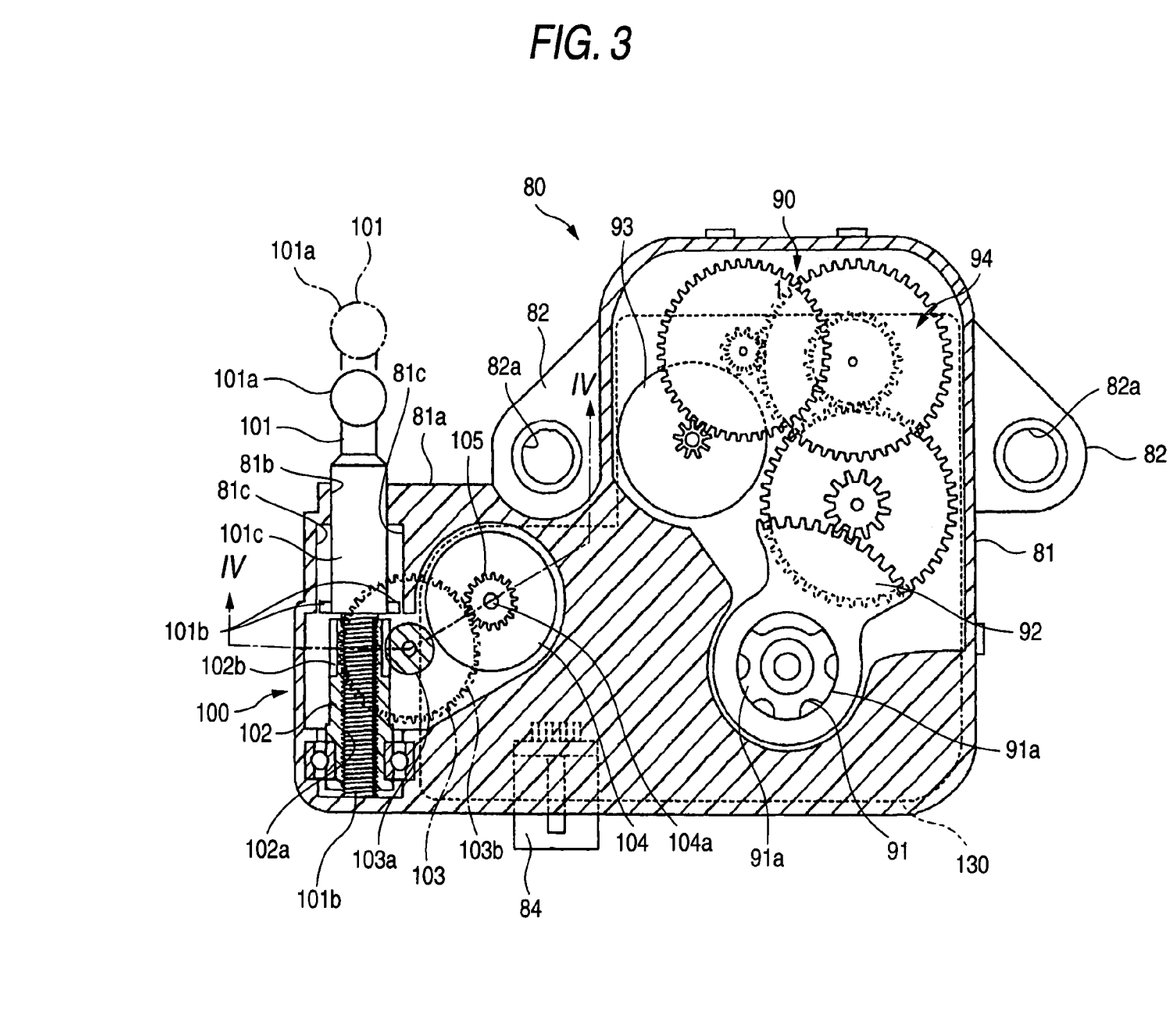
FIG. 3 is a partially cut-away perspective view illustrating driving mechanism of the first embodiment of the lighting apparatus according to the invention.
Figure 4:
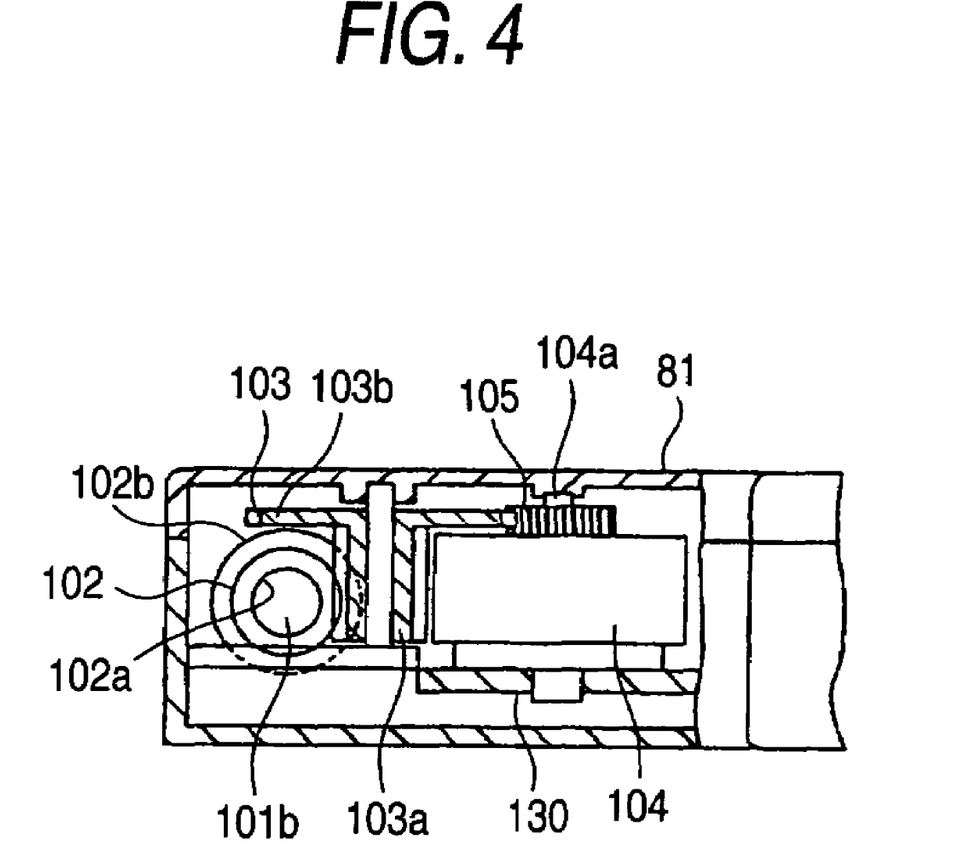
FIG. 4 is a front view illustrated by cutting along a part IV—IV shown in FIG. 3.

As is seen from FIGS. 3 and 4, the biaxial actuator 80 is configured by constituting the horizontal driving mechanism 90 and the vertical driving mechanism 100 in a single housing 81.

The horizontal driving mechanism 90 has a swivel driving shaft 91 protruding from the top surface of the housing 81. The swivel driving shaft 91 is rotated by being driven by the horizontal driving mechanism 90. Engaging projections 91a, 91a, . . . , which axially extend, are protruded from the outer peripheral surface of the swivel driving shaft 91. When the swivel driving shaft 91 is fitted into the connecting concave portion 67a, the engaging projections 91a, 91a, . . . , engage with engaging grooves (not shown) formed in the inner peripheral surface of the connecting concave portion 67a to thereby prevent an occurrence of sliding in the direction of rotation between the swivel driving shaft 91 and the connecting concave portion 67a.

A sector gear 92 is formed at the base end portion of the swivel driving shaft 91, which is located in the housing 81, in such a manner as to be integral therewith. The sector gear 92 cooperates with a swiveling DC motor 93 disposed in the housing through a cooperating gear train 94. Therefore, the rotation of the motor 93 causes the swivel driving shaft 91 to rotate clockwise or anticlockwise according to the direction of rotation of the motor 93.

The vertical driving mechanism 100 has a leveling driving shaft 101 enabled to freely slide forwardly and backwardly with respect to the housing 81. The leveling driving shaft 101 has a spherical element 101a at the rear end thereof. A fronter-side part of the leveling driving shaft 101, which is located frontwardly of the spherical element 101a, consists of a threaded shaft portion 101b and a sliding portion 101c positioned between the threaded shaft portion 101c and the spherical element 101a. Sliding pins 101d, 101d serving as detents are provided on the sliding portion 101c in such a way as to protrude therefrom. Further, the spherical element 101a and a part of the sliding portion 101c of the leveling driving shaft are passed rearwardly from the inside of the housing 81 through a through hole 81b formed in a rear surface wall 81a of one side portion of the housing 81. The sliding pins 101d, 101d are slidably engaged with sliding grooves 81c, 81c formed in the rear surface wall 81a.

A sleeve 102 having an inner peripheral surface 102a, in which a screw groove is formed, is rotatably provided in the housing 81. A wheel portion 102b is formed on the outer peripheral surface of the sleeve 102 in such a manner as to be integral therewith. Further, the threaded shaft portion 101b of the leveling driving shaft 101 is screwed into the screw groove formed in the inner peripheral surface 102a of the sleeve 102.

A connecting gear 103 constituted by a worm portion 103a and a spur gear 103b, which are coaxially formed integrally with each other, is rotatably disposed in the housing 81. The worm portion 103a meshes with the wheel portion 102b of the sleeve 102.

Furthermore, a leveling DC motor 104 is disposed in the housing 81. A pinion gear 105 fixed to a rotating shaft 104a of the motor 104 is meshed with the spur gear portion 103b.

Therefore, when the motor 104 rotates, the connecting gear 103 is rotated through the rotating shaft 104a thereof and the pinion gear 105. Further, the sleeve 102 meshed with the worm portion 103a of the connecting gear 103 and with the wheel portion 102b is rotated. When the sleeve 102 is rotated, the threaded shaft portion 101b is advanced by a screw groove formed in the inner peripheral surface 102a of the sleeve 102 because the sliding pins 101d, 101d engage with the sliding grooves 81c of the housing 81 to thereby make the leveling driving shaft 101 unrotatable. Consequently, the leveling driving shaft 101 slides rearwardly or forwardly according to the direction of rotation of the motor 104.

Mounting pieces 82, 82 are provided in the housing 81 of the biaxial actuator 80 in such a way as to protrude therefrom. Mounting screws 83, 83 passed through screw insertion holes 82a, 82a from below are screwed into the mounting bosses 53b, 53b formed on the lower supporting piece 53 of the bracket 50. Consequently, the biaxial actuator 80 is fixed to the bottom surface of the lower supporting piece 53.

When the biaxial actuator 80 is fixed to the bottom surface of the lower supporting piece 53 of the bracket 50 as described above, the swivel driving shaft 91 of the horizontal driving mechanism 90 is connected to the connecting concave portion 67a of the lamp unit 60 in such a way as to be fitted thereinto. Further, the leveling driving shaft 101 of the vertical driving mechanism 100 is rearwardly protruded. Furthermore, the spherical element 101a provided at the rear end of the leveling driving shaft 101 is fitted into a receiving concave portion (not shown) formed in a receiving concave portion (not shown) formed in a sphere-receiving element 22 supported by the rear surface wall 21 of the lamp body 20. Consequently, the rear end of the leveling driving shaft 101 is connected to the lamp body 20 in such a way as to be in a state in which the leveling driving shaft 101 is freely tiltable.

A connector 84 is provided at the front surface portion of the housing 81, so that electric power and signals are supplied externally through the connector 84 to a circuit board disposed in the housing 81.

A discharge bulb is used as the light source bulb 62 of the lamp unit 60. Thus, a lighting circuit unit 110 for tuning on the discharge bulb is disposed in a lower portion of the lamp body 20. A bulb socket 112 is connected to an end of a cord 111 extending from the lighting circuit unit 110. The bulb socket 112 is connected to the light source bulb 62. Thus, a lighting voltage generated by the lighting circuit provided in the lighting circuit unit 110 is applied to the light source bulb 62 through the bulb socket 112. Consequently, the light source bulb 62 is turned on.

Next, the tilting of the irradiation direction of the lamp unit 20 in the horizontal direction and the vertical direction is described.

When the swiveling DC motor 93 is rotated in a predetermined direction in response to, for example, a steering operation, the swiveling driving shaft 91 rotates clockwise or anticlockwise according to the direction of the rotation of the motor 93. This rotation of the swiveling driving shaft 91 causes the lamp unit 60 to turn rightwardly or leftwardly around a line connecting the supporting point shaft 66 to the connecting concave portion 67a, which serves as an axis of turn. Consequently, the irradiation direction is changed rightwardly or leftwardly.

When the leveling DC motor 104 is rotated by an operation caused from a driver seat or by an automatic operation, the leveling driving shaft 101 is moved backwardly or frontwardly according to the direction of the rotation. Consequently, the spacing between a place, to which the biaxial actuator 80 is fixed, on the bracket 50 and the rear surface wall 21 of the lamp body 20 is changed. Thus, the bracket 50 is tilted downwardly or upwardly around a line that serves as an axis of turn and that connects portions, which support the nut elements 72, 72 of the turn-supporting-point portions 70, 70, to each other. Consequently, the lamp unit 60 supported by the bracket 50 is tilted downwardly or upwardly, so that the direction, in which a beam is irradiated in the lamp unit, is changed downwardly or upwardly.

Figure 5:
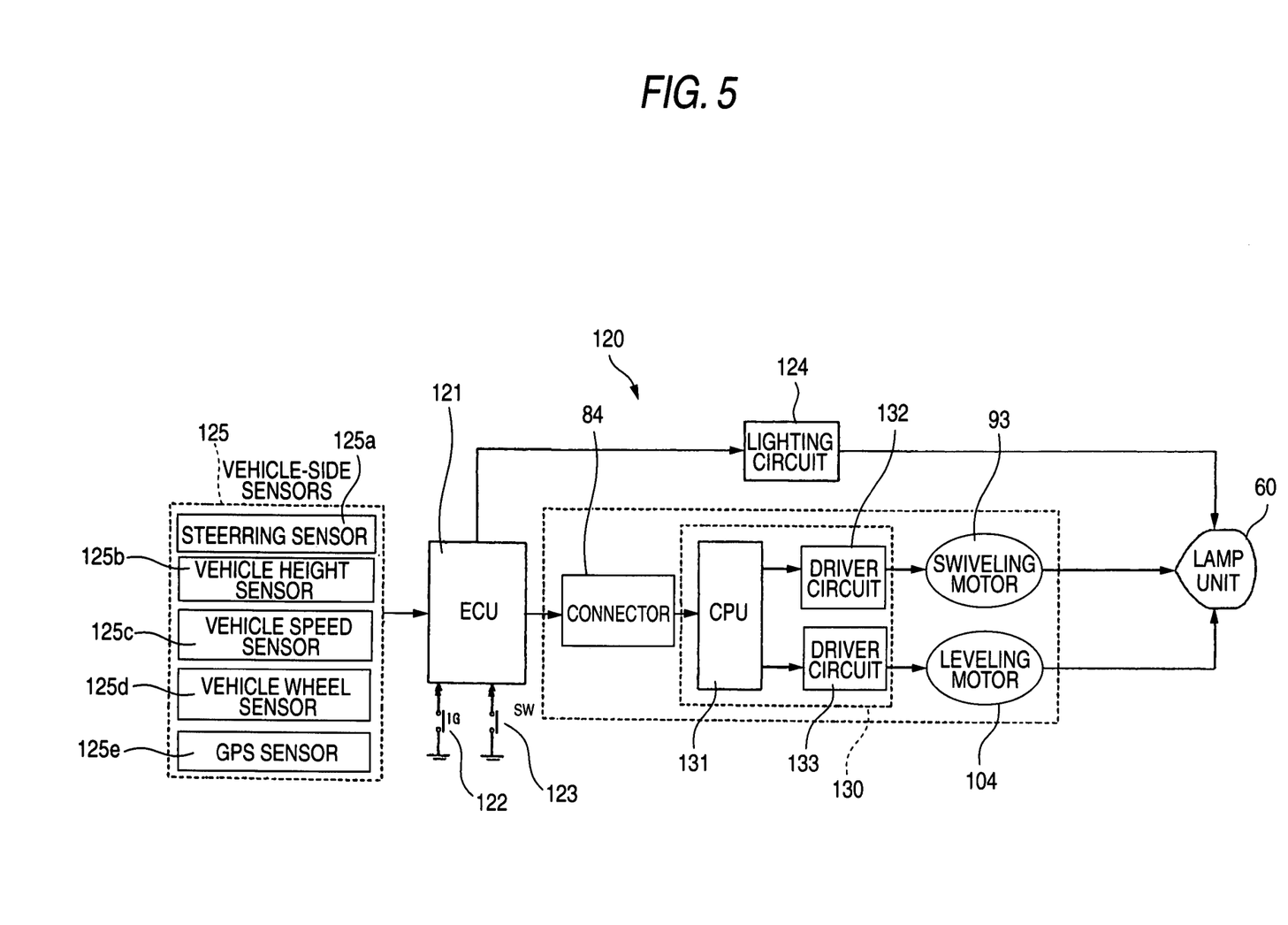
FIG. 5 is a block diagram illustrating the driving mechanism of the first embodiment of the lighting apparatus according to the invention.

An example of a control circuit 120 for controlling the irradiation direction by using the biaxial actuator 80 is shown in FIG. 5.

The control circuit 120 has an ECU (electronic control unit) 121 for controlling the entire headlamp system including the vehicle headlamp 10. An ignition switch 122 and a lamp switch 123 are connected to the ECU 121. Further, when the lamp switch 123 is operated (that is, turned on) in a state in which the ignition switch 122 is operated (that is, turned on), a lighting command is issued from the ECU 121 to a lighting circuit 124. Consequently, the light source bulb 62 of the lamp unit 60 is turned on by the lighting circuit 124. A beam having the predetermined light distribution pattern is frontwardly irradiated.

Signals sent from various kinds of sensors 125 are inputted to the ECU 121. Signals outputted from, for example, a steering sensor 125a, a vehicle height sensor 125b, a vehicle speed sensor 125c, a vehicle wheel sensor 125d, and a GPS sensor 125e are inputted thereto. Information concerning a steering direction and a steering angle, which is sent from the steering sensor 125a when a steering operation is performed, information concerning the height of each of front and rear axles, which is sent from the vehicle height sensor 125b, information concerning a vehicle speed, which is sent from the vehicle speed sensor 125c, information concerning the height of each of running wheels, which is sent from the vehicle wheel sensor 125d, and information concerning a current position based on a global positioning system, which is sent from the GPS sensor 125e, are inputted thereto. Further, the ECU 121 outputs predetermined control signals to the biaxial actuator 80 according to the information sent from each of the sensors 125 in such a way as to optimize the irradiation direction. The biaxial actuator 80 receives the control signals from the ECU 121 through the single connector 84.

A circuit board 130 is disposed in the housing 81 of the biaxial actuator 80. A CPU (central processing unit) 131, into which a control program is incorporated, is mounted on the circuit board 130. Predetermined control signals are sent from the ECU 121 to the CPU 131 through the connector 84. The CPU 131 sends predetermined signals according to the control signals, which are obtained from the ECU 121, to driver circuits 132, 133 configured on the circuit board 130. The swiveling DC motor 93 and the leveling DC motor 104 are driven by the driver circuits 132, 133, respectively.

Because the horizontal driving mechanism 90 and the vertical driving mechanism 100 are integrated with each other and configured as the single biaxial actuator 80 in the vehicle headlamp 10, the man-hours needed for mounting the actuator in the lamp is small. Also, the number of the mounting components is small. Moreover, the number of places (in the aforementioned embodiment, the bracket 50), on which the driving mechanism are mounted, in the lamp body and so forth is one. Consequently, the structure of the lamp body, the lamp unit, or the bracket can be simplified. Thus, the manufacturing cost of these members can be reduced.

Also, because the horizontal driving mechanism 90 and the vertical driving mechanism 100 are provided in the single housing 81, the man-hours required to assemble the two driving mechanism can be reduced. Consequently, the manufacturing cost thereof can be decreased.

Furthermore, because the biaxial actuator 80 constituted by integrating the horizontal driving mechanism 90 and the vertical driving mechanism 100 is supported by the bracket 50 that is tiltable with respect to the lamp body 20, the positions of the driving mechanism do not protrude toward the rear of the lamp body 20. Consequently, the depth of the lamp (that is, the vehicle headlamp) 10 can be reduced.

Also, the assembling of the lamp unit 60 to the lamp body 20 can be performed in front thereof. Thus, the assembling efficiency is favorably enhanced. This contributes to reduced cost. That is, the adjusting shafts 71, 71 supported by the lamp body 20 are caused to preliminarily support the nut elements 72, 72. The positions of nut-element mounting holes (not shown) in the bracket 50, on which the lamp unit 60 and the biaxial actuator 80 are mounted, are adjusted to the nut elements 72, 72, respectively. Further, the position of the spherical element 101a formed at the rear end of the leveling driving shaft 101 of the biaxial actuator 80 is adjusted to the sphere receiving element 22 mounted on the lamp body 20. In such a state, the bracket 50 is pressed rearwardly. Thus, the nut elements 72, 72 can be fitted into the nut-element mounting holes, and the spherical element 101a provided at the rear end of the leveling driving shaft 101 can be fitted into the spherical concave portion of the sphere receiving element 22. Consequently, the lamp unit 60 can be assembled into the lamp body 20 through the bracket 50.

Furthermore, the supply of electric power and/or a control signal to the horizontal driving mechanism 90 and the vertical driving mechanism 100 is performed through the single connector 84. Thus, the number of components (for instance, the connector) can be reduced. Also, wiring in the lamp chamber 40 can be simplified. Especially, as described in the foregoing description of the embodiment, the connector 84 is disposed at the front end portion of the housing 81. Thus, a cord 84a connected to the connector 84 is not positioned in the rear space of the lamp chamber 40. Consequently, the depth of the lamp body 20 can be reduced. The cord 111 connecting the lighting unit 110 to the bulb socket 112 necessarily has to be placed at the rear portion of the lamp chamber 40 due to the positional relation between the lighting unit 110 and the light source bulb 62. Additionally, because the cord 111 is horizontally moved with the turn in the horizontal direction of the lamp unit 60, it is necessary to ensure a space therefor in the rear portion of the lamp chamber 40. The cord, which is drawn from the actuator, is placed at the rear portion of the lamp chamber 40, which has such significance, with the results that a space, in which the cord 111 moves, should be ensured at a place, which keeps away from the cord, and that the depth of the lamp body 20 should be increased for that.

Circuits respectively used for controlling the horizontal driving mechanism 90 and the vertical driving mechanism 100 are placed on the same circuit board 130. Thus, the biaxial actuator 80 can be miniaturized. Moreover, a power supply circuit and control components can be shared by the two driving mechanism 90 and 100 to thereby enable reduction in the number of components.

[Second Embodiment]

Figure 6:
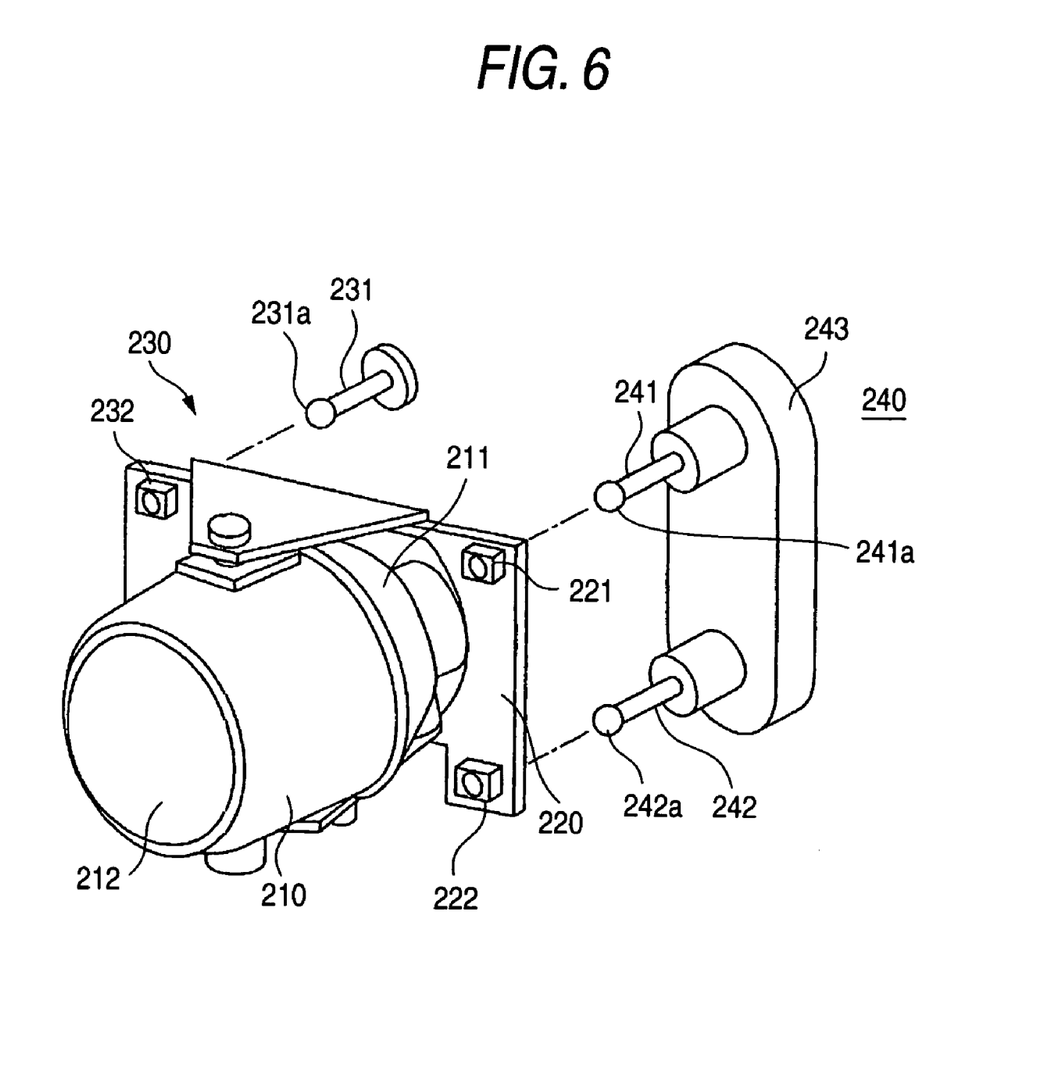
FIG. 6 is a schematic primary part exploded perspective view illustrating a second embodiment of the lighting apparatus according to the invention.

FIG. 6 shows a primary part of a second embodiment of the lighting apparatus according to the invention.

A lamp unit 210 is fixedly attached to a bracket 220.

The lamp unit 210 has a reflector 211 and a projection lens 212, and converges light outputted from a light source bulb (not shown). Moreover, the lamp unit 210 irradiates the light frontwardly as a beam having the light distribution pattern, the upper edge of which is limited by a shade placed at a light converging region, by using the projection lens 212.

The bracket 220 is tiltably supported by the lamp body (not shown) through a single turn-supporting-point portion 230 and a biaxial actuator 240.

The turn-supporting-point portion 230 comprises a supporting-point shaft 231 fixed to the rear surface wall of the lamp body, and also comprises a sphere receiving element 232 supported on one side portion of the bracket 220. The turn-supporting-point portion 230 is configured by rotatably fitting a sphere element portion 231a, which is formed integrally with the front end of the supporting-point shaft 231, into a spherical concave portion (not shown) formed in the sphere receiving element 232.

The biaxial actuator 240 has two driving shafts 241 and 242. A driving mechanism having a motor, which is used for separately moving the two driving shafts 241 and 242 frontwardly and backwardly, and also having various kinds of gears and the like is constructed in a housing 243. A circuit for controlling the driving mechanism is configured on the circuit board, which is disposed in the housing. Each of separate spherical elements 241a, 242a is formed at the front end of an associated one of the driving shafts 241, 242 in such a way as to be integral therewith.

Two sphere receiving elements 221, 222 are supported on the other side portion of the bracket 220, that is, a side portion opposite to the side portion, on which the sphere receiving element 232 of the turn-supporting-point portion 230 is supported, in such a manner as to be spaced apart from each other in an upward-downward direction. A spherical concave portion (not shown) is formed in each of the sphere receiving elements 221 and 222. Further, the spherical element portion 241a of the upper driving shaft 241 is rotatably fitted into the spherical concave portion of the upper sphere receiving element 221. Furthermore, the spherical element portion 242a of the lower driving shaft 242 is rotatably fitted into the spherical concave portion of the lower sphere receiving element 222. Consequently, the other side portion of the bracket 220 is supported by the lamp body through the biaxial actuator 240.

The tilting of the lamp unit is performed as follows.

First, when the two driving shafts 241 and 242 move simultaneously in the same direction by an equal amount, the bracket 220 turns horizontally by employing a place, at which the sphere receiving portion 232 of the turn-supporting-point portion 230 is supported, as a turn supporting point. Thus, the lamp unit 210 supported by the bracket 220 is similarly turned horizontally, so that the irradiation direction is changed horizontally.

Further, when one of the driving shafts 241 and 242, for instance, the lower driving shaft 242 moves, the bracket 220 turns vertically by using a line connecting a place, at which the sphere receiving element 221 is supported, and a place, at which the sphere receiving element 232 is supported, as an axis of turn. Thus, the lamp unit 210 supported by the bracket 220 is similarly turned vertically, so that the irradiation direction is changed vertically.

That is, the driving shafts 241 and 242, and the mechanism for driving the driving shafts 241 and 242 serve as the horizontal driving mechanism when the driving shafts 241 and 242 move simultaneously in the same direction by an equal amount. When only one of the driving shafts 241 and 242 moves or when the driving shafts 241 and 242 move simultaneously in different directions, these driving shafts and the mechanism for driving thereof serve as the vertical driving mechanism.

This second embodiment obtains advantages similar to those of the first embodiment.

The lighting apparatus of a vehicle according to the invention can widely be used as a lamp for a vehicle that is required to run while selecting an optimum beam irradiation direction according to a running state, road surface conditions, running-region environment, and so on.

It will be apparent to those skilled in the art that various modifications and variations can be made to the described preferred embodiments of the present invention without departing from the spirit or scope of the invention. Thus, it is intended that the present invention coverall modifications and variations of this invention consistent with the scope of the appended claims and their equivalents.

What is claimed is:

1. A lighting apparatus of a vehicle comprising:
a lamp body, including a lamp unit, wherein an irradiation direction of the lamp unit is changed according to a running state of the vehicle;
a horizontal driving mechanism for horizontally changing the irradiation direction; and
a vertical driving mechanism for vertically changing the irradiation direction,
wherein the horizontal driving mechanism and the vertical driving mechanism are integrated with each other and are provided in a single housing, which housing is accommodated within the lamp body.

2. The lighting apparatus according to claim 1, wherein the horizontal driving mechanism and the vertical driving mechanism are supported tiltably with respect to the lamp body.

3. The lighting apparatus according to claim 2, wherein the horizontal driving mechanism and the vertical driving mechanism are fixed on a bracket supported tiltably with respect to the lamp body,
wherein the horizontal driving mechanism rotates the lamp unit supported rotatably with respect to the bracket, and
wherein the vertical driving mechanism tilts the bracket with respect to the lamp body.

4. The lighting apparatus according to claim 1, wherein an electric power and a control signal to the horizontal driving mechanism and the vertical driving mechanism are supplied through a single connector.

5. The lighting apparatus according to claim 1, wherein circuits for driving the horizontal driving mechanism and the vertical driving mechanism are disposed on a same board.

6. A lighting apparatus of a vehicle comprising:
a lamp unit, wherein an irradiation direction of the lamp unit is changed according to a running state of the vehicle;
a horizontal driving mechanism for horizontally changing the irradiation direction;
a vertical driving mechanism for vertically changing the irradiation direction;
an upper driving shaft; and
a lower driving shaft,
wherein the horizontal driving mechanism and the vertical driving mechanism are integrated with each other,
wherein the upper and lower driving shafts serve as the horizontal driving mechanism, when the upper and lower driving shafts move simultaneously in the same direction by an equal amount, and
wherein the upper and lower driving shafts serve as the vertical driving mechanism, when only one of the upper and lower driving shafts moves or when the upper and lower driving shafts move simultaneously in different directions.

7. A lighting apparatus of a vehicle comprising:
a lamp body including a lamp unit, wherein an irradiation direction of the lamp unit is changed according to a running state of the vehicle;
a horizontal driving mechanism for horizontally changing the irradiation direction; and
a vertical driving mechanism for vertically changing the irradiation direction,
wherein the horizontal driving mechanism and the vertical driving mechanism are integrated with each other, and
the horizontal driving mechanism and the vertical driving mechanism are supported tiltably with respect to the lamp body.

8. The lighting apparatus according to claim 7, wherein the horizontal driving mechanism and the vertical driving mechanism are fixed on a bracket supported tiltably with respect to the lamp body,
wherein the horizontal driving mechanism rotates the lamp unit supported rotatably with respect to the bracket, and
wherein the vertical driving mechanism tilts the bracket with respect to the lamp body.

* * * * *